United States Patent [19]

Jaeger

[11] Patent Number: 5,777,603
[45] Date of Patent: Jul. 7, 1998

[54] FLAT PANEL DISPLAY WITH OPTICAL SIGNAL TRANSPARENT ZONE

[75] Inventor: Denny Jaeger, Oakland, Calif.

[73] Assignee: Intertactile Technologies Corporation, Oakland, Calif.

[21] Appl. No.: 644,794

[22] Filed: May 10, 1996

Related U.S. Application Data

[63] Continuation-in-part of Ser. No. 420,438, Apr. 10, 1995, Pat. No. 5,572,239, which is a continuation of Ser. No. 225,782, Apr. 11, 1994, abandoned, which is a continuation-in-part of Ser. No. 147,545, Nov. 5, 1993, abandoned.

[51] Int. Cl.⁶ ......................................................... G09G 5/00
[52] U.S. Cl. ............................. 345/172; 345/184; 341/23
[58] Field of Search ................................. 345/168, 169, 345/170, 171, 172, 173, 184, 905, 174, 55, 59, 43, 67; 341/22, 23, 28, 33, 34

[56] References Cited

U.S. PATENT DOCUMENTS

| | | |
|---|---|---|
| 3,826,949 | 7/1974 | Nakamura et al. ........................ 345/43 |
| 4,893,115 | 1/1990 | Blanchard ................................ 345/174 |
| 5,034,602 | 7/1991 | Garcia, Jr. et al. ...................... 341/23 |
| 5,418,760 | 5/1995 | Kawashima et al. .................... 345/173 |

FOREIGN PATENT DOCUMENTS

| | | | |
|---|---|---|---|
| 2038055 | 7/1980 | United Kingdom ............... 345/172 |
| 9512877 | 5/1995 | WIPO . |

*Primary Examiner*—Regina Liang
*Attorney, Agent, or Firm*—Harris Zimmerman

[57] ABSTRACT

A flat panel display facilitates operation of one or more electrical circuit control devices by providing changeable images which convey information pertinent to operation of the circuit. The manually movable member of the circuit control device, such as a turnable knob for example, is attached to the face of the display within the image area of the display. The display has a light transparent zone within the image area which extends to the back of the display to enable photoelectric detection of the setting of the movable member by a detector which is situated behind the flat panel display. Row and column busbar conductors within the flat panel display, which control light intensity at image pixels, are routed around the light transparent zone to prevent optical signal degradation.

12 Claims, 5 Drawing Sheets

FLAT PANEL DISPLAY WITH OPTICAL SIGNAL TRANSPARENT ZONE

CROSS REFERENCE TO RELATED APPLICATIONS

This is a continuation-in-part of application Ser. No: 08/420,438 filed Apr. 10, 1995 now U.S. Pat. No. 5,572,239 which was a continuation of application Ser. No. 08/225,782 filed Apr. 11, 1994 and which is now abandoned, application Ser. No. 08/225,782 was a continuation-in-part of application Ser. No. 08/147,545 filed Nov. 5, 1993 which is now abandoned.

TECHNICAL FIELD

This invention relates to flat panel displays which display electronically produced changeable images. More particularly the invention relates to flat panel displays which are associated with electrical circuit control devices and which display changeable graphics that convey information pertinent to operation of the circuit control device.

BACKGROUND OF THE INVENTION

Devices for enabling operator control of electrical apparatus may variously have turnable or slidable knobs, depressible switch buttons, pivotable levers or the like which are manipulated by an operator in the course of controlling the apparatus. In most cases symbols, legends, graduation marks or other graphics are present on the control device to identify settings of the operator manipulated member, to identify the function of the control device or for other purposes which facilitate operation of the control. Traditionally such graphics have been permanently imprinted on the control device.

Imprinted graphics can convey only a limited amount of information and cannot be easily changed. Many recent electronic systems have controls that are used for different purposes during different modes of operation of the system. Permanent graphics designed to facilitate one mode of operation of the system are usually inappropriate during other modes of operation. Plural sets of labels, graduation marks and the like can be imprinted on the face of a control device but this can be confusing to the operator and can cause imprecise setting of a control if some of the graphics must be located away from the immediate vicinity of the operator manipulated member of the control. An overlay having different graphics can be placed on a control panel or the like when the functions of the controls change but this is a diversion which complicates and slows operation of the controls.

Flat panel displays electronically produce changeable images. It has heretofore been recognized that operation of manually manipulated circuit control devices can be facilitated by using displays of this kind to display graphics pertaining to operation of the controls. The graphics can change instantly and automatically when the function of the control device changes.

Prior circuit controls which use a flat panel display to present graphics pertaining to operation of the control typically locate labels or other graphics an undesirable distance away from the control member that is manipulated by the operator. The displays have an image area that is smaller than the total area of the face of the display as structural framing, seals, electrical conductors and the like are situated in the marginal region of the display. The spacing of the graphics from the operator manipulated control member is not conducive to display of calibration or graduation marks in immediate proximity to the member.

One prior circuit control of this kind avoids this problem by situating small switches directly on the face of a flat panel display within the image area. In another the switch buttons of switches that are otherwise directly behind the display extend through openings in the display. These prior circuit controls use displays of an early type, segmented electrode displays, that can present only a very limited variety of images and only at fixed locations in the image area.

Flat panel displays of the type which include busbars and which present images defined by an array of image pixels can produce any desired image, including moving images, at any desired location in the image area. It would be advantageous to use displays of this kind to present graphics in proximity to the operator manipulated member of a circuit control device without requiring that the entire control device be at the front of the display or requiring that openings extend through the display at the image area. Flat panel displays of this kind contain layers of minute closely spaced parallel busbar conductors which supply voltage to pixels of the image and which would be disrupted by openings passing through the image area of the display if the display is of one of the known constructions.

The present invention is directed to overcoming one or more of the problems discussed above.

SUMMARY OF THE INVENTION

In one aspect, the present invention provides a flat panel display which includes an electrically controlled display screen having an image area for displaying changeable images. Components within the display screen include a layer of optically active material and first and second layers of busbar layers extending in parallel relationship therewith for applying localized electrical fields to pixel points within the layer of optically active material. A light transparent zone extends through the display screen at the image area of the screen. The busbar conductors of the first and second busbar layers have opposite end segments that are linear and in alignment with each other. The ones of the busbar conductors which have end segments that are directed towards the light transparent zone have non-linear intermediate segments which link the end segments and which are outside of the light transparent zone, the intermediate segments being within a region of the display screen that adjoins the light transparent zone.

In another aspect of the invention an electrical circuit control device has a manually movable control member attached to the face of the display screen. The movable control member is in front of the transparent zone and at least partially within the image area of the screen. A circuit control signal source behind the display screen has a light emitting component and a photoelectric light detector positioned to respond to light which is reflected back from the manually movable member through the light transparent zone.

In another aspect of the invention a flat panel display controller is coupled to the flat panel display and initiates changeable images at the image area of the screen that convey information pertinent to operation of the electrical circuit control device.

In still another aspect of the invention a flat panel display includes a multi-layered display screen having at least a transparent substrate layer, a transparent cover plate which is spaced apart from the substrate layer and which extends in parallel relationship therewith, a layer of optically active material situated between the cover plate and the substrate layer and first and second layers of spaced apart busbar conductors. Busbar conductor of the first layer extend in orthogonal relationship with the busbar conductors of the second layer. The display screen has a light transparent zone which is within the image display area and which extends through each of the layers of the screen. Busbar conductors of each layer that have aligned end segments directed towards the light transparent zone have intermediate segments which link the aligned end segments and which are routed around the light transparent zone within the region of the display screen which adjoins the light transparent zone.

The invention enables display of instantly changeable graphics that convey information pertaining to operation of an electrical circuit control device including display of such graphics in immediate proximity to the device. This is accomplished without requiring that the entire control device be situated at the face of the flat panel display or requiring that a through passage extend through the image area of the display. Images of the graphics are produced by a flat panel display of the type having an array of changeable image pixels and thus the images can have any desired form and can appear at any desired location in the vicinity of the circuit control device.

The invention, together with further aspects and advantages thereof, may be further understood by reference to the following description of the preferred embodiments and by reference to the accompanying drawings.

DETAILED DESCRIPTION OF THE PREFERRED EMBODIMENTS

Figure 1:
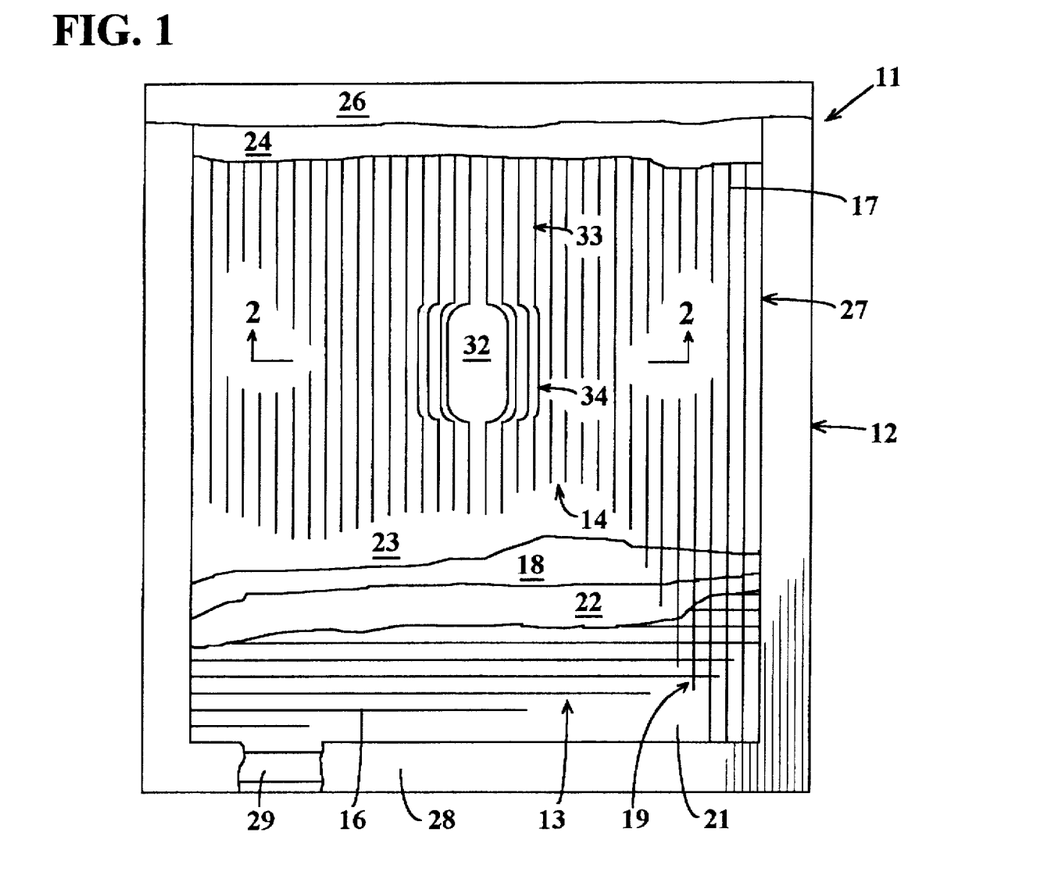
FIG. 1 is a broken out frontal view of a flat panel display embodying the invention.
Figure 2:
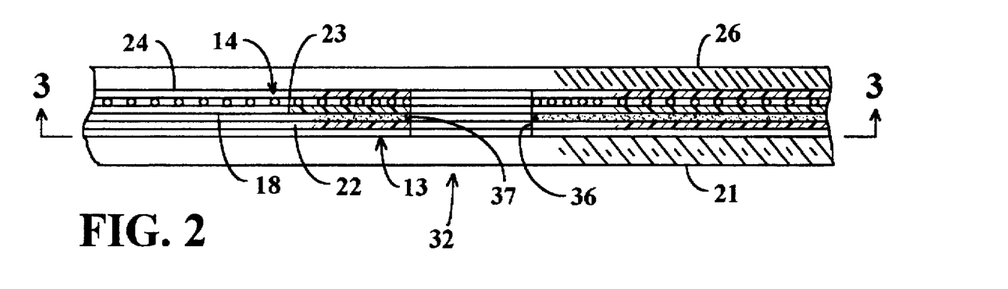
FIG. 2 is an enlarged section view of a central region of the apparatus of FIG. 1 taken along line 2—2 thereof.

Referring jointly to FIGS. 1 and 2 of the drawings, the invention is applicable to flat panel displays 11 of any of the types which include busbars 16 and 17. Displays 11 of these types have a display screen 12 with a multi-layered construction which includes first and second layers 13 and 14 of busbar conductors 16 and 17 respectively and a layer 18 of optically active material. In prior display screens of this general type the x-coordinate or row busbars 16 of a first of the layers 13 extend in orthogonal relationship with the y-coordinate or column busbar conductors 17 of the second layer 14. This orthogonal relationship of the busbar conductors 16 and 17 is also present in the display screen 12 of the present example except at one or more localized areas of the screen which will hereinafter be described.

The busbar conductors 16 and 17 are used to create an electrical field at any of an array of image pixel points 19. In display screens such as the display screen 12 of this particular example the busbar layers 13 and 14 are at opposite sides of the optically active material layer 18 and the pixel points 19 are the points at which a busbar conductor 17 of the second busbar layer crosses over a busbar conductor 16 of the first busbar layer. In active matrix display screens both busbar layers are at the same side of the optically active material and the pixels are defined by minute electrodes which are adjacent to the busbar conductor cross over points. In either case, individual image pixels 19 are energized by applying a voltage difference across the row busbar conductor 16 and the column busbar conductor 17 that cross over each other at or adjacent to the pixel. This creates a localized electrical field within the optically active material 18 at the site of the pixel 19 which changes an optical property of the material at the site of the pixel 19. The display 11 of this particular example of the invention is of the TFEL (thin film electro-luminescent) type and thus the optically active material 18 is a phosphor which emits light at ones of the pixels 19 which are energized at any given time. Other optically active materials require an external light source and react differently to the electrical field in ways which are known to the art.

Additional layers in the display screen 12 include a flat substrate 21 layer at the back of the screen which may be formed of glass or other insulative material. Substrate 21 is, in sequence, overlaid by the first layer 13 of busbar conductors 16, a first insulation layer 22, the layer 18 of optically active material, a second layer 23 of insulation, the second layer 13 of busbar conductors 17, a polymer sealing and passivation layer 24 and a flat cover plate 26 formed of glass or the like.

For clarity of illustration certain components of the display screen 12 are shown in the drawings with a greater thickness, greater spacing and/or as being fewer in number than is actually the case in a typical display screen 12 which embodies the invention. Such components may be too minute to be depicted with the preferred sizes and spacings in drawings which depict the entire display screen or a sizable portion of the screen. For example, the busbar conductors 16 and 17, insulation layers 22, 23 and phosphor layer 18 are typically extremely thin films which may be formed by photolithic techniques and deposition techniques known to the art. Busbar conductors 16 and 17 are typically more minute, greater in number and more closely spaced than can be depicted in FIGS. 1 and 2. In order to provide images which exhibit desirably high resolution there may, for example, be 80 to 300 busbar conductors per inch.

The internal layers 13, 17, 18, 22, 23 and 24 define the active image area 27 of the display screen 12 and are of less extent than the substrate 21 and cover plate 26 thereby providing a margin or border region 28 of the display within which electrical connections to the ends of the busbar conductors 16 and 17 may be made. Multiplexing circuits 29 which apply voltage to ends of the busbar conductors 16 and 17 may have one of the circuit configurations known to the art and in this example are embodied in integrated circuit boards 31 which are embedded in the border region 28 of the display screen 12.

Figure 3:
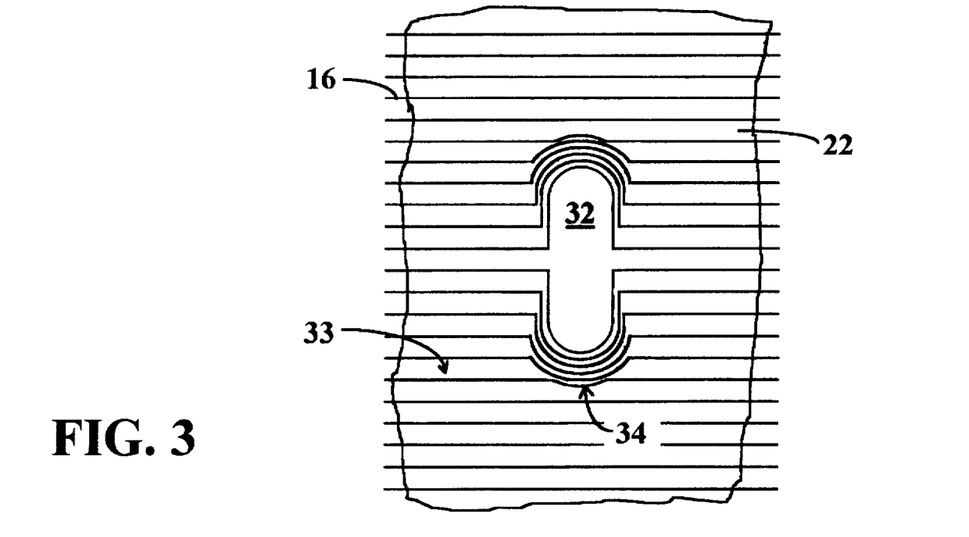
FIG. 3 is a section view of the apparatus of the preceding figures taken along line 3—3 of FIG. 2.

The flat panel display 11 is designed to enable efficient detection of the position of a movable component which is in front of the display screen 12 by photoelectric detection from the back of the screen. Referring jointly to FIGS. 1 and 3, one or more light transparent zones 32 extend through the display screen 12 at locations which are partly or wholly within the image display area 27. To avoid degradation of optical signals, those of the busbar conductors 16 and 17 that would otherwise intersect a transparent zone 32 are routed around the zone. Such busbar conductors 16 and 17 have aligned end segments 33 linked by curved or angled intermediate segments 34 which are situated in a region of the screen 12 that adjoins the transparent zone 32 and which are coplanar with the end segments.

The region of the display screen 12 at which the nonlinear intermediate segments 34 are located is unusable for image depiction. To minimize the size of the unusable area, the spacing of the intermediate segments 34 from each other is smaller than the spacing of the end segments 33 from each other. The spacing of the intermediate segments 34 can, for example, be reduced to as little as five microns using known photolithic techniques. With that spacing, up to 100 busbar conductors can be accommodated in a space that is only 0.5 millimeters wide. If necessary, a further minimization of the unusable area can effected by forming the intermediate segments 34 to have a width that is smaller than the width of the end segments 33. Thus the unusable area does not have any significant effect with respect to displaying graphics in close proximity to the light transparent zone 32. In most instances the unusable area is not apparent to a viewer of the display screen 12 as it is covered by a control device component at the front of the screen as will hereinafter be described in more detail.

Thus busbar conductors 16 and 17 remain continuous but are not present in the transparent zone 32 and do not degrade optical signals which pass through the transparent zone. Opaque conductors, if present, would significantly attenuate optical signals and transparent conductors, such as indium tin oxide conductors, would also have adverse effects under some conditions.

Referring again to FIGS. 1 and 2 in conjunction, optical signal attenuation within the light transparent zone 32 can be further reduced by providing an open passage 36 through the layer 18 of optically active material at the location of the light transparent zone 32 which passage preferably extends through the insulation layers 22 and 23 and passivation and sealing layers 24. A thin seal 37 or a band of sealant extends around the periphery of the passage 36 at the layer 18 of optically active material.

Figure 4:
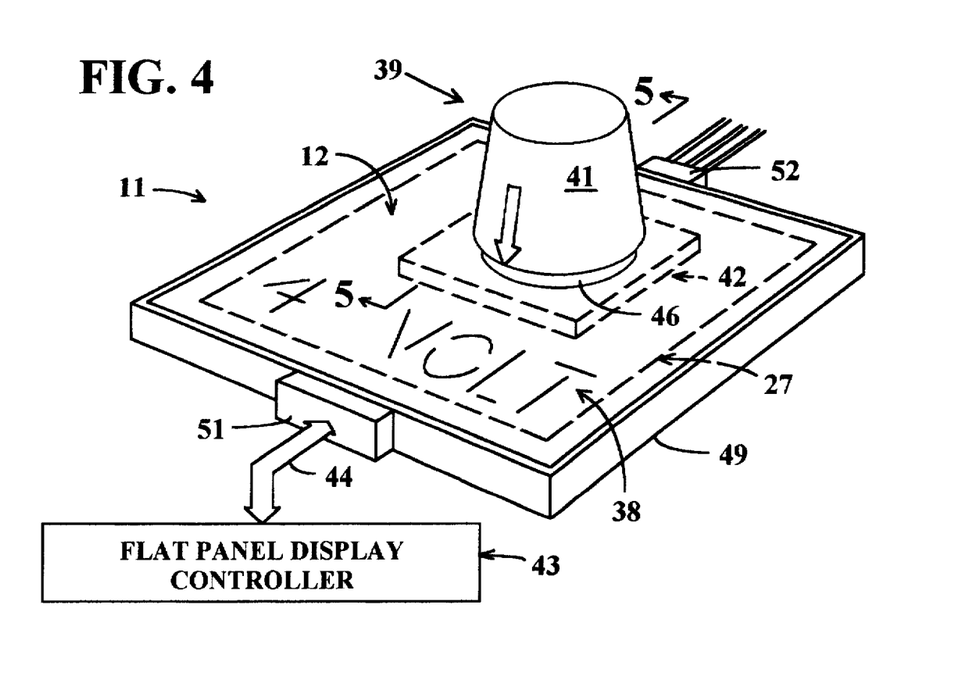
FIG. 4 is a perspective view showing an electrical circuit control device integrated with the flat panel display of the preceding figures in order to provide changeable graphics for the device.

Referring to FIG. 4, the flat panel display 11 can provide changeable graphics 38 for an electrical circuit control device 39 which may be of any of diverse different types. For purposes of example, the circuit control device 39 of FIG. 4 is a potentiometer of the type which outputs a variable voltage having a magnitude determined by the rotational orientation of a knob 41 which may be turned by an operator of the device. The knob 41 is disposed at the front of the display screen 12 over the previously described light transparent zone which is not visible in FIG. 4. A circuit control signal source 42 at the back of the display screen 12 tracks rotary movement of the knob 41 and produces an output signal voltage having a magnitude which increases when the knob is turned in one direction and which decreases when the knob is turned in the opposite direction. A flat panel display controller 43 which may be of one of the known designs is coupled to the flat panel display 11 and to the control signal source 42 through a multiconductor bus 44 to cause display of the changeable graphics 38. The graphics 38 may, for example, be a numerical indication of the current output voltage of the potentiometer.

Figures 5, 6:
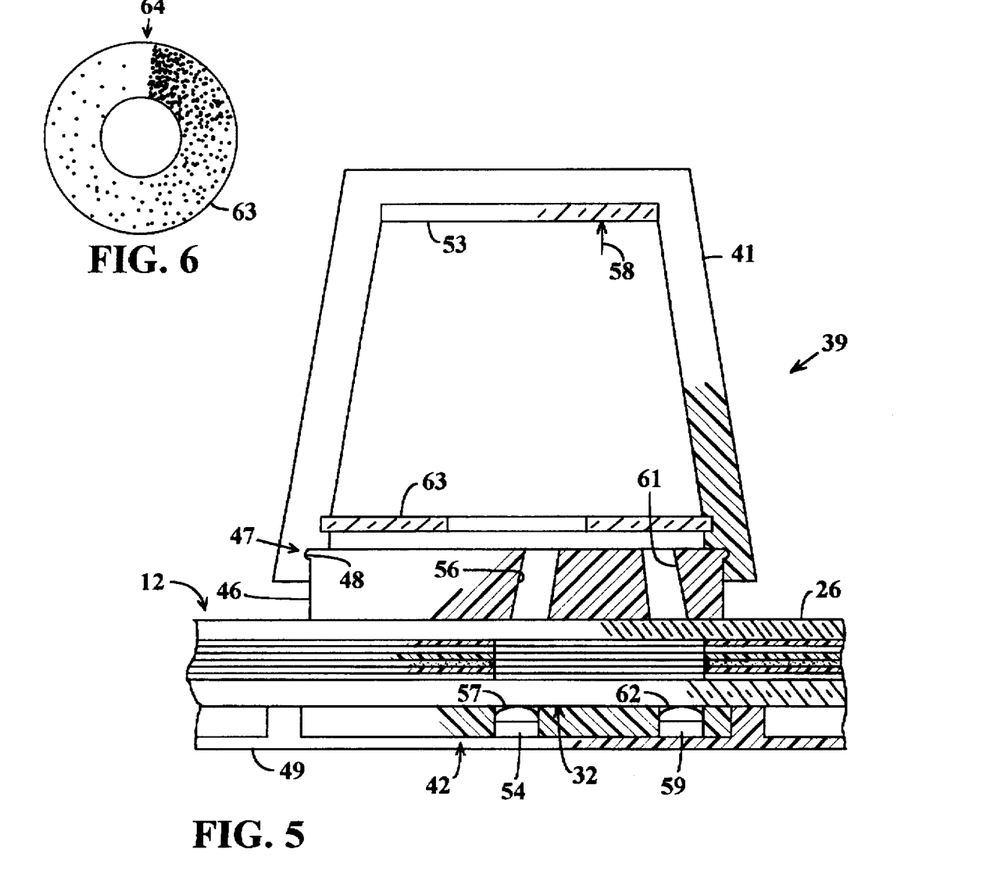
FIG. 5 is a cross section view of a central portion of the apparatus of FIG. 4 taken along line 5—5 thereof.
FIG. 6 is a plan view of a light signal modulating component of the apparatus of FIGS. 4 and 5.

Referring jointly to FIGS. 4 and 5, the knob 41 of this example is hollow and open at its back end and is attached to the face of the display screen 12 by snap engagement on a circular base 46. For this purpose an annular lip 47 on the outer end of base 46 seats in a conforming annular groove 48 in the inside wall of the knob 41. The base 46 is secured to cover plate 26, by an adhesive, over the light transparent zone 32. The display screen 12 is contained within an open topped housing 49. A first connector 51 on housing 49 provides for connection of the flat panel display controller 43 to the display screen 12 and a second connector 52 enables connection of the potentiometer 39 with an external power supply and a circuit which is controlled by the potentiometer as will hereinafter be further described.

A mirror 53 is situated within the hollow interior of knob 41 and faces the display screen 12. The circuit control signal source 42 has a light emitting component 54 situated behind the light transparent zone 32 of display screen 12 and which directs light towards the mirror through the transparent zone and through a first passage 56 in knob base 46. The light emitting component 54 of this particular example is an LED (light emitting diode) but other types of light source may also be used. The term light as used herein should be understood to refer to infrared light and ultraviolet light as well as to visible light.

A lens 57 between LED 54 and the back of display screen 12 focuses light from the LED at a focal point, designated by arrow 58 in FIG. 5 which is at the plane of mirror 53. The mirror 53 reflects such light back to a photoelectric light detector 59 situated behind the display screen 12 through another passage 61 in knob base 46 and through the transparent zone 32 of the screen. Another lens 62 situated in front of detector 59 focuses the returned light at the detector. The light detector 59 of this particular embodiment is a phototransistor but other forms of detector may also be used.

An open centered flat annular light modulator 63 is contained within the knob 41 in coaxial relationship therewith, the modulator being secured to the knob by adhesive so that it turns with the knob. Light traveling from LED 54 to mirror 53 passes through the open center of modulator 63 and thus is not affected by the modulator. Referring jointly to FIGS. 5 and 6, light which the mirror 53 reflects back to phototransistor 59 passes through the body of the modulator 63. The modulator 63 has a light transmissivity that is maximized at one radial zone 64 of the modulator and which progressively decreases at successive other radial zones 66 of the modulator. The modulator 63 is oriented to locate the zone 64 of maximum light transmissivity in the path of the light which is directed towards phototransistor 59 by mirror 53 when knob 41 is at the zero degree or off position. Areas of the modulator 63 of progressively decreasing light transparency are brought into coincidence with that light path as the knob 41 is turned in a clockwise direction.

Thus the intensity of light at phototransistor 59 is a function of the angular orientation of knob 41 and progressively decreases as the knob is turned clockwise from its zero degree position. This causes the electrical resistance of the phototransistor 59 to progressively increase as the knob 41 is turned in that direction.

Figure 7:
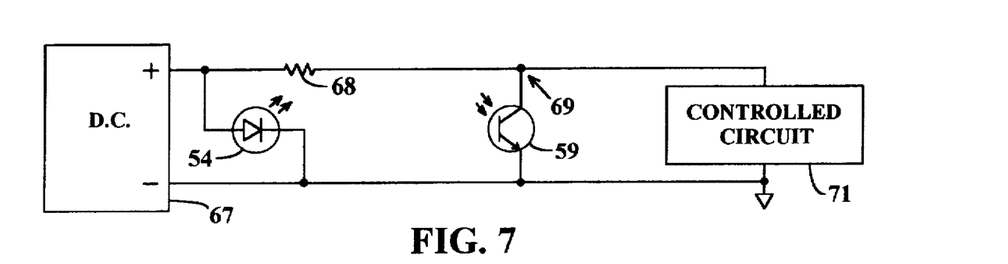
FIG. 7 is a schematic circuit diagram illustrating the interconnection of electronic components of the apparatus of FIGS. 4 to 7.

Referring to FIG. 5 and 7, LED 54 is connected across the terminals of a regulated voltage supply 67 and phototransistor 59 is connected across the same terminals in series relationship with a resistor 68. The circuit junction 69 between resistor 68 and phototransistor 59 provides the output voltage of the potentiometer 39 and is connected to the controlled circuit 71 which may be of any of the types that respond to an operator selected variable voltage. The circuit junction 69 may be connected to the controlled circuit 71 through an analog to digital converter in instances where the controlled circuit is of a type which requires a digital control signal.

Mirror 53 may itself function as the light modulator and the separate modulator 63 may be eliminated if the mirror is silvered to have a progressively decreasing degree of light reflectivity at successive angular locations around the mirror. the variation being similar to the variation of light transmissivity that is depicted in FIG. 6.

Figure 8:
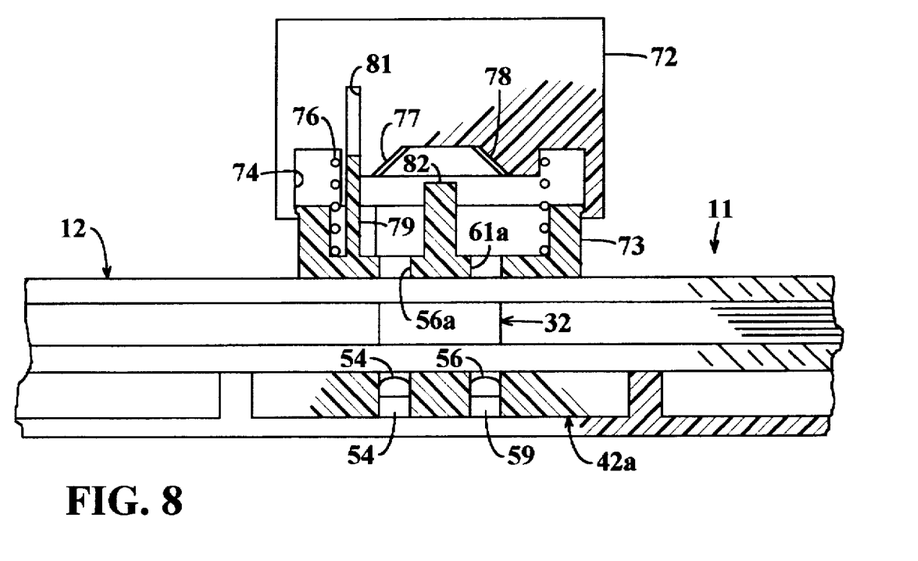
FIG. 8 is a broken out end view of another electrical circuit control device integrated with a flat panel display to provide changeable graphics.
Figure 9:
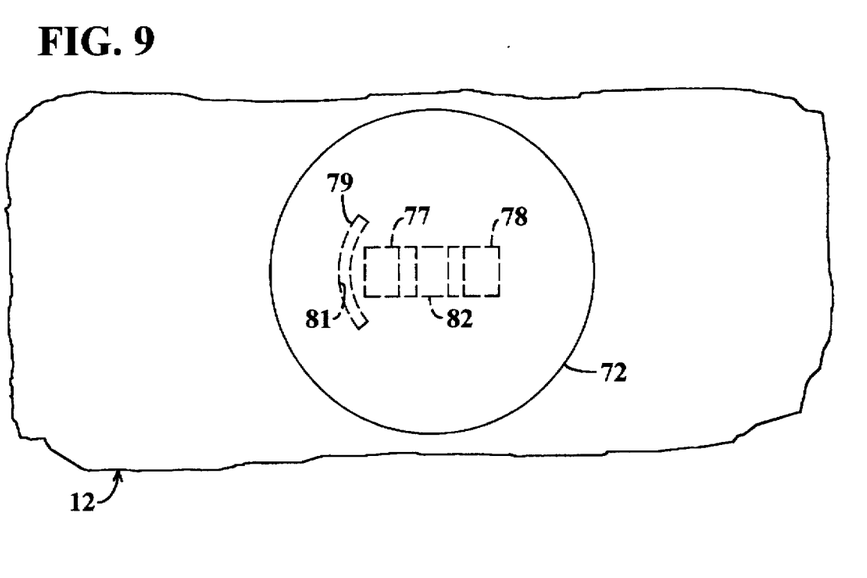
FIG. 9 is a top view of the apparatus of FIG. 8.

Coaction of the flat panel display 11 with a circuit control device 39 of the type having a turnable knob is but one example of the applicability of the invention to electrical circuit control devices. The invention can be adapted to coact with other types of manually manipulated control device such as, for example, control devices at which the operator moves a slidable knob along a track or pivots a lever. The configuration of the light transparent zone in the display screen and the location and form of the photoelectric detection means behind the screen may be varied as needed to accommodate to the differing types of control device. As another specific example, FIGS. 8 and 9 depict adaptation of the invention to an electrical switch type of circuit control at which the operator depresses a switch button 72 to send a voltage pulse to a controlled circuit.

Switch button 72 is snap engaged on a circular base 73 which is adhered to the flat panel display 11 over the light transparent zone 32 of the display screen 12 in the manner previously described. The base 73 extends into an annular chamber 74 in the button 72 that is of sufficient depth to enable the button to be pushed towards the display screen 12 and to be returned to a normal position by a coil spring 76 which extends between the base and the button. The flat panel display screen 12 may be similar to that previously described with respect to the first specific example of the invention. The circuit control signal source 42a at the back of the light transparent zone 32 may also be similar to the corresponding component of the previously described embodiment except that the LED 54 and phototransistor 59 in this case are at opposite sides of the centerline of switch button 72 and equidistant therefrom. The light passages 56a and 61a in base 73 are similarly positioned and extend at right angles to the display screen at locations directly in front of LED 54 and phototransistor 59. A first mirror 77 carried by switch button 72 is positioned to intercept light from LED 54 which travels through passage 56a. The first mirror 77 is inclined at an angle of 450° relative to the path of travel of such light in order to reflect the intercepted light towards an oppositely inclined second mirror 78 which is also carried by the switch button 72. The second mirror 78 is situated directly in front of light passage 61a and phototransistor 59 in order to reflect the light from first mirror 77 towards the phototransistor.

A key projection 79 extends from base 73 into a conforming slot 81 in switch button 72 to prevent rotation of the button. The button 72 and base 73 are formed of opaque material. The lenses 54 and 62 at LED 54 and phototransistor 59 are not essential to operation of the device but can enhance the sharpness of the switch signals which are outputted. The lenses 54 and 56 preferably have focal lengths equal to the distance of the lens from the closest mirror 77 or 78 plus one half of the distance between the two mirrors.

The electrical circuit of the apparatus of FIGS. 8 and 9 including connections to a controlled electrical circuit may be similar to those previously described with reference to FIG. 7. When switch button 72 is at its normal position, outward from display screen 12, mirrors 77 and 78 direct light from LED 54 to phototransistor 59. The resulting high conductivity within the phototransistor 59 maintains the voltage at the output terminal 69 in a low state. An opaque blade 82 extends outward from base 73 behind switch button 72 in position to interrupt the passage of light from mirror 77 to mirror 78 when an operator pushes the switch button towards the display screen 12. Interruption of the light beam causes the electrical resistance of phototransistor 59 to rise. This causes the voltage at output terminal 69 to rise and to remain high until the operator releases the switch button 72.

Figure 10:
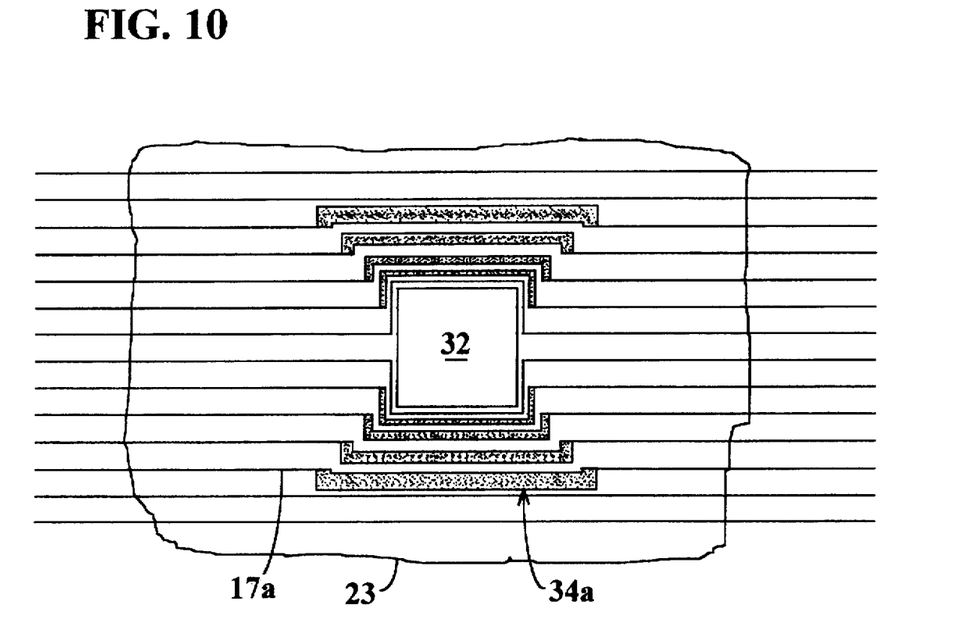
FIG. 10 is a diagrammatic view illustrating a preferred configuration for busbar conductors in flat panel displays which embody the invention.

Referring again to FIGS. 1 and 3, routing of the busbar conductors 16 or 17 in a layer of busbar conductors around a transparent zone 32 in the display screen causes the conductors to have different lengths and therefore different degrees of electrical resistance. This may detract from image quality in instances where there is a large variation in the resistances of the conductors. This may be counter acted in the manner shown in FIG. 10. In particular, the non-linear intermediate segments 34a of the busbar conductors 17a may be formed to have different widths and/or thicknesses which are dependent on the lengths of the intermediate segments and which are selected to equalize the electrical resistances of all busbar conductors in the layer of busbar conductors.

Some types of flat panel display have a color filter layer that includes conductors. The filter layer conductors may be routed around the transparent zone 32 or zones in the same manner that has been herein described with respect to the busbar conductors.

While the invention has been described with reference to certain specific embodiments for purposes of example, many modifications and variations are possible and it is not intended to limit the invention except as defined in the following claims.

I claim:

1. A flat panel display having an electrically controlled display screen with an image area for displaying changeable images, said display screen having a layer of optically active material and first and second layers of busbar conductors for applying localized electrical fields to pixel points within said layer of optically active material, wherein the improvement comprises:

said display screen having a light transparent zone which extends through said display screen at said image area thereof, said busbar conductors of said first and second layers having opposite end segments that are linear and in alignment with each other and wherein ones of said busbar conductors which have end segments that are directed towards said light transparent zone have non-linear intermediate segments which link said end segments and which are outside of said light transparent zone, said intermediate segments being within a region of said display screen that adjoins said light transparent zone, an electrical circuit control device having a manually movable control member attached to a face of said display screen and being in front of said light transparent zone and at least partially within said image area and a circuit control signal source disposed behind said display screen, said circuit control signal source having a light emitting component and having a photoelectric light detector positioned to respond to light which is reflected back from said manually movable control member through said light transparent zone.

2. The apparatus of claim 1 wherein the spacing of said intermediate segments from each other is smaller than the spacing of said end segments from each other.

3. The apparatus of claim 1 wherein said intermediate segments of said busbar conductors are of differing lengths and wherein progressively longer ones of said intermediate segments have progressively greater transverse dimensions which cause each of said intermediate segments to have substantially the same electrical resistance.

4. The apparatus of claim 1 wherein said layer of optically active material is discontinuous at said light transmissive zone thereby providing an optical path along said zone that is free of said optically active material.

5. The apparatus of claim 1 wherein said light transmissive zone has a front region formed by a transparent cover plate of said display screen which extends in parallel relationship with said first and second layers of busbar conductors and said layer of optically active material and has a back region formed by a substrate layer of said display screen which extends in parallel relationship with said cover plate at a location behind said optically active layer.

6. The apparatus of claim 5 wherein said layer of optically active material has an open area therein at the location of said light transmissive zone.

7. The apparatus of claim 6 further including a seal bounding said open area of said layer of optically active material at least at said light transmissive zone.

8. The apparatus of claim 5 wherein said light transmissive zone has an intermediate region defined by an open passage within said display screen which extends between said cover plate and said substrate layer.

9. The apparatus of claim 1 wherein said opposite end segments of said busbar conductors of said first layer thereof extend in orthogonal relationship with said opposite end segments of said busbar conductors of said second layer thereof, the intermediate segments of said busbar conductors of each layer being coplanar with the end segments of the layer.

10. The apparatus of claim 1 further including a light intensity modulator secured to said manually movable control member and being movable therewith, said light intensity modulator being in an optical path along which said light travels between said light emitting component and said photoelectric light detector through said light transparent zone.

11. The apparatus of claim 1 further including a flat panel display controller coupled to said flat panel display and which initiates changeable images at said image area which convey information pertinent to operation of said electrical circuit control device.

12. A flat panel display which displays changeable images at an image area thereon comprising:

a multi-layered display screen having at least a transparent substrate layer, a transparent cover plate which is spaced apart from the substrate layer and which extends in parallel relationship therewith, a layer of optically active material situated between said cover plate and said substrate layer, first and second layers of spaced apart busbar conductors wherein busbars of said first layer thereof extend in orthogonal relationship with the busbar conductors of said second layer thereof, said display screen having a light transparent zone which is within said image display area and which extends through each of said layers thereof, wherein busbar conductors of each layer thereof that have aligned end segments directed toward the light transparent zone have non-linear intermediate segments which link the aligned end segments and which are routed around the light transparent zone within the region of said display screen which adjoins the light transparent zone an electrical circuit control signal generating device having a manually movable member attached to said display screen in front of said light transparent zone, a light modulator carried by said manually movable member, a light emitting component disposed behind said display screen in position to direct light towards said light modulator, a control signal generating light detector disposed behind said display screen in position to respond to modulated light which is returned from said manually movable member through said light transparent zone.

* * * * *